United States Patent
Frank et al.

(10) Patent No.: US 8,483,519 B2
(45) Date of Patent: Jul. 9, 2013

(54) MOBILE IMAGE SEARCH AND INDEXING SYSTEM AND METHOD

(75) Inventors: Christopher Edward Frank, Orono, ME (US); David Caduff, Degen (CH)

(73) Assignee: IPointer Inc., Bakersfield, CA (US)

( * ) Notice: Subject to any disclaimer, the term of this patent is extended or adjusted under 35 U.S.C. 154(b) by 743 days.

(21) Appl. No.: 12/649,845

(22) Filed: Dec. 30, 2009

(65) Prior Publication Data

US 2010/0306200 A1   Dec. 2, 2010

Related U.S. Application Data

(63) Continuation-in-part of application No. 12/645,231, filed on Dec. 22, 2009, and a continuation-in-part of application No. 12/645,243, filed on Dec. 22, 2009, and a continuation-in-part of application No. 12/645,248, filed on Dec. 22, 2009, now Pat. No. 8,184,858.

(60) Provisional application No. 61/141,547, filed on Dec. 30, 2008, provisional application No. 61/139,843, filed on Dec. 22, 2008, provisional application No. 61/139,900, filed on Dec. 22, 2008, provisional application No. 61/139,907, filed on Dec. 22, 2008.

(51) Int. Cl.
 *G06K 9/60* (2006.01)
(52) U.S. Cl.
 USPC .......................................... 382/306; 382/305
(58) Field of Classification Search
 USPC ................................. 382/305, 306
 See application file for complete search history.

(56) References Cited

U.S. PATENT DOCUMENTS

| | | | |
|---|---|---|---|
| 5,214,757 | A | 5/1993 | Mauney et al. |
| 5,470,233 | A | 11/1995 | Fruchterman et al. |
| 5,592,382 | A | 1/1997 | Colley |
| 5,628,050 | A | 5/1997 | McGraw et al. |
| 5,633,946 | A | 5/1997 | Lachinski et al. |
| 5,745,113 | A | 4/1998 | Jordan et al. |

(Continued)

FOREIGN PATENT DOCUMENTS

| | | |
|---|---|---|
| WO | WO-2008/005795 | 1/2008 |
| WO | WO-2009/111578 | 9/2009 |

(Continued)

OTHER PUBLICATIONS

International Search Report for PCT/US2009/069237 from the International Searching Authority of the United States Patent & Trademark Office dated Mar. 4, 2010, 2 pages.

(Continued)

*Primary Examiner* — Anand Bhatnagar
*Assistant Examiner* — Soo Park
(74) *Attorney, Agent, or Firm* — Wilmer Culter Pickering Hale & Dorr LLP.

(57) ABSTRACT

A computer-implemented system and method are described for image searching and image indexing that may be incorporated in a mobile device that is part of an object identification system. A computer-implemented system and method relating to a MISIS client and MISIS server that may be associated with mobile pointing and identification system for the searching and indexing of objects in in situ images in geographic space taken from the perspective of a system user located near the surface of the Earth including horizontal, oblique, and airborne perspectives.

16 Claims, 6 Drawing Sheets

U.S. PATENT DOCUMENTS

| | | | |
|---|---|---|---|
| 5,771,169 A | 6/1998 | Wendte | |
| 5,848,373 A | 12/1998 | DeLorme et al. | |
| 6,070,167 A | 5/2000 | Qian et al. | |
| 6,144,318 A | 11/2000 | Hayashi et al. | |
| 6,173,239 B1 | 1/2001 | Ellenby | |
| 6,222,482 B1 | 4/2001 | Gueziec | |
| 6,247,019 B1 | 6/2001 | Davies | |
| 6,262,741 B1 | 7/2001 | Davies | |
| 6,282,362 B1 | 8/2001 | Murphy et al. | |
| 6,334,087 B1 | 12/2001 | Nakano et al. | |
| 6,381,540 B1 | 4/2002 | Beason et al. | |
| 6,385,541 B1 | 5/2002 | Blumberg et al. | |
| 6,456,938 B1 | 9/2002 | Barnard | |
| 6,486,831 B1 | 11/2002 | Martorana et al. | |
| 6,496,776 B1 | 12/2002 | Blumberg et al. | |
| 6,504,541 B1 | 1/2003 | Liu et al. | |
| 6,532,304 B1 | 3/2003 | Liu et al. | |
| 6,606,542 B2 | 8/2003 | Hauwiller et al. | |
| 6,708,109 B1 | 3/2004 | Pradhan et al. | |
| 6,732,120 B1 | 5/2004 | Du | |
| 6,795,768 B2 | 9/2004 | Bragansa et al. | |
| 6,799,115 B1 | 9/2004 | Childs et al. | |
| 6,847,883 B1 | 1/2005 | Walmsley et al. | |
| 6,879,838 B2 | 4/2005 | Rankin et al. | |
| 6,912,545 B1 | 6/2005 | Lundy et al. | |
| 6,930,715 B1 | 8/2005 | Mower | |
| 6,965,828 B2 | 11/2005 | Pollard | |
| 6,982,697 B2 | 1/2006 | Wilson et al. | |
| 6,983,202 B2 | 1/2006 | Sanqunetti | |
| 7,003,136 B1 | 2/2006 | Harville | |
| 7,031,875 B2 | 4/2006 | Ellenby et al. | |
| 7,072,665 B1 | 7/2006 | Blumberg et al. | |
| 7,174,301 B2 | 2/2007 | Florance et al. | |
| 7,245,923 B2 | 7/2007 | Frank et al. | |
| 7,295,922 B2 | 11/2007 | Simon | |
| 7,418,341 B2 | 8/2008 | Wuersch et al. | |
| 7,991,283 B2 * | 8/2011 | Chen et al. | 396/310 |
| 8,160,400 B2 * | 4/2012 | Snavely et al. | 382/305 |
| 2001/0044309 A1 | 11/2001 | Bar et al. | |
| 2002/0140745 A1 | 10/2002 | Ellenby et al. | |
| 2002/0155844 A1 | 10/2002 | Rankin et al. | |
| 2002/0165662 A1 | 11/2002 | Maruyama et al. | |
| 2002/0171586 A1 | 11/2002 | Martorana et al. | |
| 2003/0083063 A1 | 5/2003 | Wang et al. | |
| 2003/0149557 A1 | 8/2003 | Cox et al. | |
| 2004/0002303 A1 | 1/2004 | Hirokawa | |
| 2004/0021780 A1 | 2/2004 | Kogan | |
| 2004/0024522 A1 | 2/2004 | Walker et al. | |
| 2004/0078278 A1 | 4/2004 | Dauga et al. | |
| 2004/0087294 A1 | 5/2004 | Wang | |
| 2004/0145591 A1 | 7/2004 | Luo et al. | |
| 2005/0075119 A1 | 4/2005 | Sheha et al. | |
| 2005/0108646 A1 | 5/2005 | Willins et al. | |
| 2005/0125145 A1 | 6/2005 | Sakashita et al. | |
| 2005/0130671 A1 | 6/2005 | Frank et al. | |
| 2005/0162523 A1 * | 7/2005 | Darrell et al. | 348/211.2 |
| 2005/0165548 A1 | 7/2005 | Persson | |
| 2005/0288858 A1 | 12/2005 | Amer et al. | |
| 2006/0041375 A1 | 2/2006 | Witmer et al. | |
| 2006/0103590 A1 | 5/2006 | Divon | |
| 2006/0208927 A1 | 9/2006 | Poor et al. | |
| 2006/0270460 A1 | 11/2006 | Konkka et al. | |
| 2006/0294062 A1 | 12/2006 | Folchetti et al. | |
| 2007/0035562 A1 * | 2/2007 | Azuma et al. | 345/633 |
| 2007/0049313 A1 | 3/2007 | Grams et al. | |
| 2007/0050129 A1 | 3/2007 | Salmre | |
| 2007/0055441 A1 | 3/2007 | Retterath et al. | |
| 2007/0150179 A1 | 6/2007 | Pinkus et al. | |
| 2007/0162942 A1 * | 7/2007 | Hamynen et al. | 725/105 |
| 2007/0288196 A1 | 12/2007 | Frank et al. | |
| 2008/0049016 A1 | 2/2008 | Shearer | |
| 2008/0070684 A1 | 3/2008 | Haigh-Hutchinson | |
| 2008/0109758 A1 | 5/2008 | Stambaugh | |
| 2008/0114564 A1 | 5/2008 | Ihara | |
| 2008/0133488 A1 | 6/2008 | Bandaru et al. | |
| 2008/0162032 A1 | 7/2008 | Wuersch et al. | |
| 2008/0262723 A1 | 10/2008 | Wuersch et al. | |
| 2009/0110235 A1 * | 4/2009 | Marti | 382/103 |
| 2009/0222482 A1 * | 9/2009 | Klassen et al. | 707/104.1 |
| 2009/0227269 A1 | 9/2009 | Frank et al. | |
| 2009/0278949 A1 * | 11/2009 | McMahan et al. | 348/222.1 |
| 2010/0097316 A1 | 4/2010 | Shaw et al. | |
| 2010/0123605 A1 | 5/2010 | Wilson | |
| 2010/0295971 A1 | 11/2010 | Zhu | |
| 2010/0303293 A1 | 12/2010 | Caduff | |
| 2010/0303339 A1 | 12/2010 | Caduff | |
| 2010/0306200 A1 | 12/2010 | Frank et al. | |
| 2010/0306707 A1 | 12/2010 | Caduff | |
| 2011/0124351 A1 | 5/2011 | Frank et al. | |

FOREIGN PATENT DOCUMENTS

| | | |
|---|---|---|
| WO | WO-2010/075455 | 7/2010 |
| WO | WO-2010/075456 | 7/2010 |
| WO | WO-2010/075466 | 7/2010 |
| WO | WO-2010/078455 | 7/2010 |

OTHER PUBLICATIONS

International Search Report for PCT/US2009/069312 from the International Searching Authority of the United States Patent and Trademark Office dated Mar. 4, 2010, 2 pages.

International Search Report for PCT/US2009/069313 from the International Searching Authority of the United States Patent and Trademark Office dated Feb. 19, 2010, 2 pages.

International Search Report for PCT/US2009/069860 from the International Searching Authority of the United States Patent and Trademark Office dated Mar. 2, 2010, 2 pages.

Egenhofer, M. J. et al., "A Mathematical Framework for the Definition of Topological Relationships", *Proceedings of the 4th International Symposium on Spatial Data Handling*, Zurich, Switzerland, Jul. 23-27, 1990, pp. 803-813.

Egenhofer, M.J. et al., "Beyond Desktop GIS A Family of Portable Spatial Information Technologies", *In GIS PlaNET*, Lisbon, Portugal, 1998, 4 pages.

Egenhofer, M.J. et al., "Categorizing binary topological relations between regions, lines, and points in geographic databases", Tech. Rep. 90-12, National Center for Geographic Information and Analysis, University of California, Santa Barbara, CA, 1990, 28 pages.

International Search Report and Written Opinion of the International Searching Authority, the European Patent Office, for International Application No. PCT/US2007/072358, dated Nov. 30, 2007, 8 pages.

International Search Report and Written Opinion, International Patent Application No. PCT/US09/36053, mailed Apr. 22, 2009, 6 pages.

Wuershch, et al., "Refined Route Instructions Using Topological Stages of Closeness," presented at the Geological Information Science Conference in Munster, Germany on Sep. 20-23, 2006 (www.giscience.org), pp. 31-41, 12 pages.

* cited by examiner

MOBILE IMAGE SEARCH AND INDEXING SYSTEM AND METHOD

CROSS-REFERENCE TO RELATED APPLICATION

This application claims priority under 35 U.S.C. §119(e) to U.S. Provisional Application No. 61/141,547, filed Dec. 30, 2008 entitled "Mobile Image Search and Indexing System and Method," and is a continuation-in-part of U.S. application Ser. No. 12/645,231 filed Dec. 22, 2009 entitled "System and Method for Initiating Actions and Providing Feedback by Pointing at Object of Interest," U.S. application Ser. No. 12/645,243, filed Dec. 22, 2009 entitled "System and Method for Exploring 3D Scenes by Pointing at a Reference Object," and U.S. application Ser. No. 12/645,248, filed Dec. 22, 2009 entitled "System and Method for Linking Real-World Objects and Object Representations by Pointing," the entire contents of which are incorporated herein by reference.

FIELD OF THE INVENTION

The present invention generally relates to computer-implemented systems and methods for image searching and indexing. More specifically, the present invention relates to computer-implemented systems and methods that are used for image searching and indexing that may be incorporated in whole or in part a mobile device.

BACKGROUND OF THE INVENTION

The ability of people to quickly differentiate and categorize objects visually enables the assessment of situations before taking deliberate actions. These deliberate actions may be based on a person's brain pattern recognition that matches context information, such as location, orientation, and time/date in deciding the identity of the object. For example, a person may see a hole in a sidewalk and walk around it to avoid being injured. "Context" as it is used for this purpose may be influenced by other factors including culture, background, and/or education.

Currently, there are conventional image search engines, e.g., "Google Image Search," that conduct web-based searches for images according to query terms. "Google" is a registered trademark of Google Inc. However, conventional image search engines do not take into account enough context information about the image to help determine the identity of the actual image content. For example when a system user types "apple" as a query into an image search engine, the search engine only will consider the name of the image or words (tags) associated with the image on a webpage. As such, search results for such a query have produced many false-positive responses. As an example, if the image search query word entered is "pepper," the search results may return images of a black Labrador dog named "Pepper," as well as pictures of green "peppers," when the intent of the system user was for images of the vegetable "pepper."

It would be very helpful to have tools or systems to improve the probability of receiving images more closely related to the desired intent of a system user's query if image searching technology was incorporated in pointing systems that are used to identify objects or sets of objects that are present in a person's (system user's) visual scene. To be more effective these tools or systems would need to acknowledge an awareness of the system user's surroundings. More particularly, it would be important for such tools or systems to make accurate image searching decisions based on the consideration of the system user's surroundings.

Desired tools or systems of the type just described would be of particular interest to mobile system users, such as travelers or tourists, who often find themselves in situations that are unfamiliar or where they encounter foreign objects. These mobile tools would need to have the ability to accept information from a wide variety of data sources and provide accurate and timely results directed to images related to the system user's visual scene. Due to the proliferation of network-connected mobile devices, including cellular telephones, Personal Data Assistants (PDAs), and ruggedized or "tough" minicomputers, platforms are readily available for such tools and systems.

Although mobile devices, such as cellular phones, PDAs, and minicomputers, are available and affordable, their information systems are typically tailored to specific computer-based data services. Further, conducting image searches using these devices are awkward and difficult given they require information to be input using miniaturized keyboards, which is time consuming as well as difficult. Additionally, protective clothing or the need to conduct ongoing surveillances makes such devices impractical for military combat use.

Even if data entry for small mobile devices, such as cellular phones and PDAs, could be automated, commercial databases typically rely on semi-structured data to produce results that are then ranked by the relevancy of keywords and word order, which is not particularly conducive to these types of mobile devices. As an example, consider the photo-sharing database FLICKR (http://www.flickr.com), which uses semi-structured data to provide picture "matches" for system users. "FLICKR" is a registered trademark of Yahoo, Inc. The accuracy of the results depends on the text entered, not only by the system user, but by the person assigning descriptions to the photo, e.g., keyword tags attached to the picture. Thus, entering the keyword "apple" in FLICKR produces over 100,000 potential returns with pictures that range from fruits to clothing styles to computers. These results would fall short of answering the system user's actual question: "apple" that is fruit.

Noting the foregoing, there is a need for increased accuracy, timeliness, and comprehensiveness of image returns for mobile users that want information through visual images relating to image search queries formulated by these mobile users. More specifically, with regard to "accuracy," the returned image data needs to closely match the system user input. Thus, given the wide variety of entries that are possible, probabilities must be assigned to provide the system user with confidence that the image data returned is not only accurate but also meaningful given the input. With regard to "timeliness," the image data returns need to be speedy, meaning typically in less than five seconds. Return times are greatly affected by the amount of image processing and matching that is required. If there are longer return times, it will typically be viewed as unacceptable. With regard to "comprehensiveness," image data queries must be able to access as many potential matches as possible. As such, image data sources should include analysis of objects in images through unstructured and semi-structured, i.e., keywords or tags, methods.

The present invention overcomes these problems of conventional image search systems and provides a system and method for image searching and indexing that provides accurate, timely, and comprehensive results.

SUMMARY OF THE INVENTION

The present invention includes computer-implemented systems and methods for image searching and image indexing that may be incorporated in a mobile device that is part of a computer-implemented object pointing and identification system. Preferably, the present invention relates to a computer-implemented mobile image searching and indexing system ("MISIS") client that may be associated with computer-implemented mobile pointing and identification system, such as described in U.S. Pat. No. 7,245,923, or co-pending U.S. patent application Ser. No. 12/645,231, U.S. Patent Application Pub. No. 2010-0303339, U.S. application Ser. No. 12/645,243, U.S. Patent Application Pub. No. 2010-0306707, and U.S. application Ser. No. 12/645,248, U.S. Patent Application Pub. No. 2010-0303293, now U.S. Pat. No. 8,184,858. According to the present invention, image searching refers to finding images in a database. Further, image indexing refers to analyzing the image context, annotating the content of images, and relating the image and this information with a reference system that makes it easy to retrieve the information.

Preferably, the MISIS client that is incorporated in mobile device includes a camera, a global positioning system ("GPS") receiver or other positioning determining unit, and a digital compass. The MISIS client also may have local storage associated with it and the MISIS client connects wirelessly to a MISIS server that includes storage or has access to storage. Storage at these locations will permit image search result processing either locally on the mobile device including the MISIS client or remotely on a MISIS server. The MISIS client is contemplated to be expandable to accept other inputs, including infrared for night imaging and sketches. This latter use may be helpful when electro-optical visibility is impaired.

The MISIS client wirelessly connects to MISIS system server that provides a computational infrastructure for indexing, storing, updating, and retrieving images. The MISIS system server connects wired or wirelessly to storage that includes a multimedia content section and a geographic information system ("GIS") data section. These are for storing the images and providing contextual information based on which images are indexed, including, but not limited to, information about geographic locations and the environment surrounding these geographic locations.

The MISIS client is preferably directed to processing in situ images. As such, the MISIS client would be preferably used for still images in geographic space taken from the perspective of a system user located near the surface of the Earth. Therefore, the orientation of the images would be approximately horizontal. This would correspond to a typical tourist's perceptual and cognitive perspective of a visual scene during a vacation. However, the present invention contemplates other kinds of images, such as highly oblique images, e.g., from the street level up to the 20$^{th}$ floor of a building, or airborne images from a bird's-eye perspective.

According to the present invention, mobile device incorporating the MISIS client will use the spatial context, i.e., position and orientation, of the MISIS client to search and index images. This will enable the image search engine to become faster and more effective, and provide fewer false-positive results. The MISIS client also will provide quality filtering that minimizes false-positives and false-negatives. A mobile device that incorporates the MISIS client for image searches will improve the system user's searching ability and the ability to learn about objects in his/her surroundings and focus on potential dangers.

The present invention will be described in greater detail in a remainder of the specification referring to the drawings.

DETAILED DESCRIPTION OF THE PRESENT INVENTION

The present invention is directed to computer-implemented systems and methods for image searching and image indexing that may be incorporated in mobile devices that is part of object pointing identification systems. More particularly, the present invention relates to a computer-implemented MISIS client and MISIS server that may be associated with computer-implemented mobile pointing and identification systems. The present invention may be used for the searching and indexing of objects in in situ images in geographic space taken from the perspective of a system user located near the surface of the Earth including horizontal, oblique, and airborne perspectives.

Figure 1:
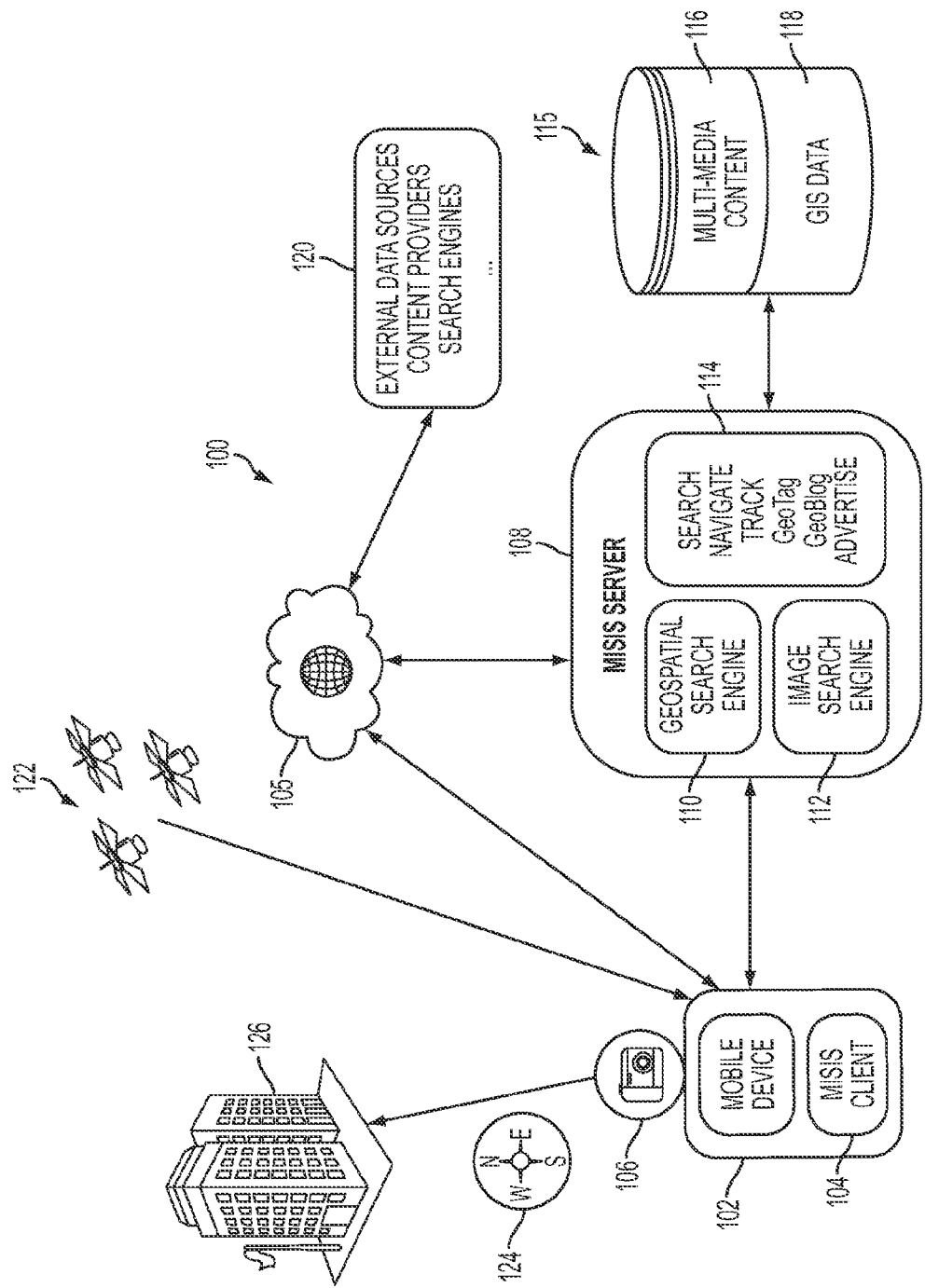
FIG. 1 shows a representative diagram incorporating the MISIS system of the present invention that includes the MISIS client and MISIS server that connects to the MISIS client.

Referring to FIG. 1, generally at 100, a system incorporating the present invention will be described. In the FIG. 1, mobile device 102 may be a mobile device according to U.S. Pat. No. 7,245,923, or a system client according to co-pending U.S. application Ser. No. 12/645,231, U.S. Patent Application Pub. No. 2010-0303339, U.S. application Ser. No. 12/645,243, U.S. Patent Application Pub. No. 2010-0306707, and U.S. application Ser. No. 12/645,248, U.S. Patent Application Pub. No. 2010-0303293, now U.S. Pat. No. 8,184,858 that is used for pointing at and identifying objects of interest within a system user's visual scene. Accordingly, U.S. Pat. No. 7,245,923, and co-pending U.S. patent application Ser. No. 12/645,231, U.S. Patent Application Pub. No. 2010-0303339, U.S. application Ser. No. 12/645,243, U.S. Patent Application Pub. No. 2010-0306707, and U.S. application Ser. No. 12/645,248, U.S. Patent Application Pub. No. 2010-0303293, now U.S. Pat. No. 8,184,858 are incorporated in their entirety herein by reference.

According to the present invention, mobile device 102 includes MISIS client 104, camera 106, digital compass 124, local storage (not shown) associated with MISIS client 104, and a GPS receiver (not shown) for carrying out the method of the present invention. Digital compass 124, the local storage, and GPS receiver may not be exclusively dedicated to MISIS client and may carry other tasks for the mobile device and still be within the scope of the present invention.

MISIS client 104 connects to MISIS server 108 via a wired or wireless connection. Preferably, MISIS client 104 connects to MISIS server 108 via a wireless connection, such as the Internet 105. MISIS server 108 includes at least geospatial search engine 110, image search engine 112, and Search/Navigate/Track/GeoTag/GeoBlog/Advertise ("SNTGGA")

unit 114. MISIS server has storage unit 115 associated with it that preferably stores at least multimedia content at 116 and GIS data at 118.

According to the present invention, with regard to MISIS server 108, geospatial search engine 110 is a search engine that is accessible by system users to perform search queries related to a geographic or spatial domain, and through which system users will receive search results generated by the search engine in response to search queries. The geographic search engine is also capable of displaying other information about the spatial domain, and through which system users will receive such as attributes that link to the spatial domain.

Image search engine 112 is a specialized search engine for finding pictures or images on the web or in a dedicated database. To search for images using the image search engine, system users will input search terms, such as keywords, image files/links, or click on an image, and the image search engine will return images "similar" to the query. The similarity measures used for search criteria include, but are not limited, meta tags, color distribution in images, or region/shape attributes. It is understood that other similarity measures may be used and still be within the scope of the present invention.

SNTGGA unit 114 is for supporting Location Based Services ("LBS") processes. LBS are information and entertainment services accessible by mobile devices through a mobile network. LBS also make use of the geographical position of the mobile device. LBS can deliver location-aware content to system users on the basis of the geographic position of the mobile device and the wireless infrastructure.

Multimedia content section 116 is for storing tagged and indexed multimedia captured by the MISIS client. Multimedia content section 116 stores, for example, images, and audio or video files.

GIS data section 118 is used to provide context for indexing and storing multimedia by image search engine 112. GIS data section 118 includes geographic data such as geographic points, geographic lines, geographic regions, or 3-D structures that are used to describe objects in a spatial domain.

Again referring to FIG. 1, External Data Sources/Content Providers/Search Engine block 120 preferably connects to MISIS server 108 wirelessly via the Internet 105 and provides access to other multimedia that is not locally stored by MISIS server 108 at storage unit 115. For the purpose of the present invention, multimedia from External Data Sources/Content Providers/Search Engine block 120 may be indexed by MISIS server 108 or multimedia from MISIS client 104 can be linked to External Data Sources/Content Providers/Search Engine block 120 and sent to MISIS server 108. Further, GPS satellites 122 provide latitude and longitude information to mobile device 102 for determining the position of the mobile device, which includes camera 106.

Digital compass is 114, which preferably is incorporated as part of mobile device 102, will define the pointing direction of the camera 106 for purposes of the present invention. The pointing direction also will define the centerline of a viewing content cone that emanates from camera 106. According to the present invention, this viewing content cone is used for purposes of searching and indexing an image for identifying images relating to objects of interest, such as building 126, with a high degree of accuracy and reliability.

Referring to FIG. 1, when a system user takes a picture or a movie of a building or landmark, such as shown at 126, with a mobile device that includes MISIS client 104, that picture is sent to MISIS server 108 where the image is tagged and indexed by image search engine 112. The tagged and indexed image is then stored in multimedia content section 116 for later retrieval as a result of a system user query.

Figure 2A:
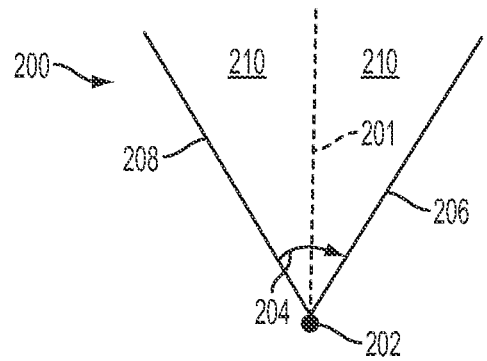
FIGS. 2A, 2B, and 2C show projections of image ranges into 2-D plane at different pointing directions and viewing angles.
Figure 2B:
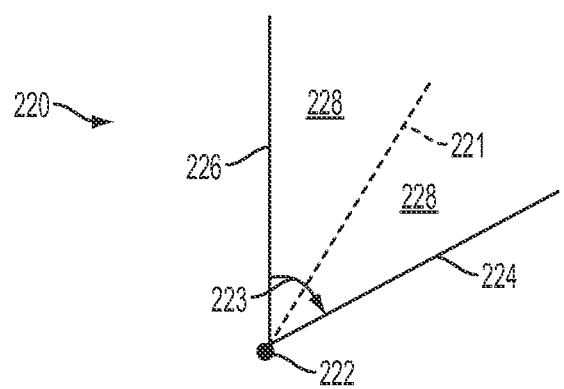
Figure 2C:
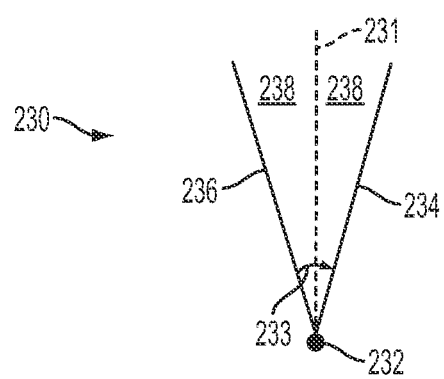

Referring to FIGS. 2A, 2B, and 2C, projections of image ranges into a two-dimensional ("2-D") plane from different pointing directions and with different viewing angles are shown generally at 200, 220, and 230, respectively. In FIG. 2A, location 202 is a point from which the projection emanates. Preferably, a mobile device incorporating the MISIS client of the present invention would be located at location 202. The pointing direction of the mobile device located at 202 is shown in phantom at 201. Given viewing angle 204, rays 206 and 208 define viewing field 210 for the mobile device in a 2-D plane.

Referring to FIG. 2B, the mobile device at 222 is shown with pointing direction 221 shown in phantom. Viewing angle 223 may be the same or different from viewing angle 204 and FIG. 2A. The viewing angle will depend on the mobile device. Given viewing angle 223, rays 224 and 226 define viewing field 228 for the mobile device in a 2-D plane.

Referring to FIG. 2C, the mobile device at 232 is shown with pointing direction 231 shown in phantom. The viewing angle for a new mobile device at 232 is shown at 233. Given viewing angle 233, rays 234 and 236 define viewing field 238. As shown in FIG. 2C, the viewing field of the mobile device at 232 is much less than the viewing field of the mobile device at 202 in FIG. 2A and the mobile device at 222 in FIG. 2B.

Preferably, the mobile devices at 202, 222, and 232 in FIGS. 2A, 2B, and 2C, respectively, will include camera 106 (FIG. 1). Therefore, each viewing field will originate from the camera location on the mobile device with a center of the field being the pointing direction in which a picture is taken. The projected range of the viewing field in the 2-D plane will be based on the horizontal viewing angle derived from the camera's focal length at the time the picture was taken. The viewing angle may vary considerably based on the type of camera objective, wide-angle, typically between 60° and 100°, or telephoto, typically between 10° to 15°. The viewing angle may be altered using these parameters if in fact the camera has a zooming capability.

Conventional systems for indexing of in situ images have been limited to the time the picture was taken, any keywords added as metadata, or some form of color distribution. However, GPS-enabled cameras have permitted the indexing of images based on the camera's location. These GPS features have provided at least a first level of spatial context available for image searching. The spatial information provides location detail for indexing but yields high false-positive and potentially false-negative hit rates when searching because the camera location is not directly related to what is being actually captured on the image. Further, an assumption that the camera location is a good surrogate for the image content also is not reliable. For example, any objects that are at the camera location, which is from where from a picture is taken, will not be included in the picture. Therefore, GPS location alone is not sufficient context for increased reliability of image searching and indexing as will be shown in FIG. 3.

Figure 3A:
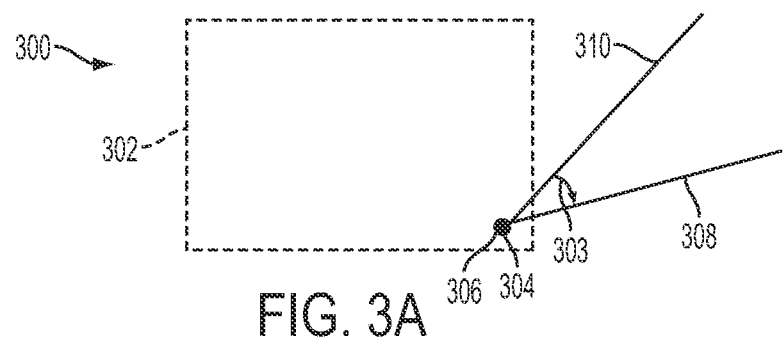
FIGS. 3A, 3B, and 3C show different possibilities for false hits for spatial image searches based on indexed locations.
Figure 3B:
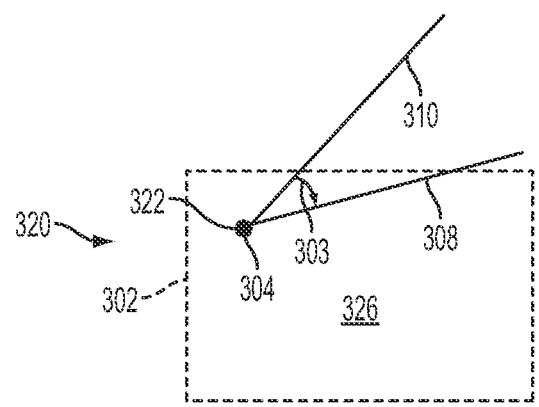
Figure 3C:
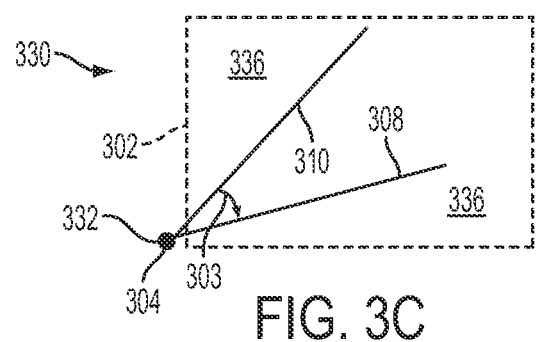

FIGS. 3A, 3B, and 3C, generally at 300, 320, and 330, respectively, show different possibilities for false hits for spatial image searches based on indexed locations. Referring to FIG. 3A, the actual captured image is shown at 302. This image would be stored in a system database. GPS-enabled camera 304 is shown at location 306. The viewing angle of camera 304 is shown at 303. The viewing field for camera 304 will be defined by rays 308 and 310 formed by viewing angle 303 considering the focal length of the lens of camera 304. At location 306 of image 302, there is a high probability of false-positive hits because only the camera is located within the image search area. More particularly, none of the image content would be located in the viewing field.

Referring to FIG. 3B, GPS-enabled camera 304 is shown at location 322. Again, the viewing angle of camera 304 is shown at 303. The viewing field of camera 304 will be defined by rays 308 and 310 formed by viewing angle 303 considering the focal length of the lens of camera 304. Given the location of camera 304 at 322, there will be fewer false-positive hits than in FIG. 3A, but only nearby content will be included in the results while more likely content in area 326 of image 302 would be excluded because only a small portion of the image falls within the viewing field.

Referring to FIG. 3C, GPS-enabled camera 304 is shown at location 332, which is outside image area 302. As in FIGS. 3B and 3C, the viewing field of camera 304 will be defined by rays 308 and 310 formed by viewing angle 303 considering the focal length of the lens of camera 304. Given the location of camera 304 at 332 outside image area 302, there will be a high probability of false-negatives hits because of this camera location. Further, a large majority of the potential objects would be missed in area 336 of the image.

As has been shown with respect to FIGS. 3A, 3B, and 3C, the content of an in situ image is constrained by the pointing direction of the camera at the time of image recordation and the viewing angle in a conventional indexing model.

The present invention integrates the GPS-enabled capabilities of cameras along with the viewing direction and viewing angle for each image so that a much more accurate assessment of the content of the in situ image is carried out. According to the present invention, preferably, spatial parameters that are used for the more accurate assessment of content of in situ images include location information captured by a GPS receiver, pointing direction by a digital compass, and the camera angle by the object's focal length at the time of recording of an image. The combination of these parameters will generate a content viewing field (viewing content cone). This viewing content cone will provide a much more accurate reference system for indexing potential infrastructure content captured in an image.

According to the present invention, the viewing content cone depth may be defined by additional parameters, which include, but are not limited to, the horizon or visual impairments, such as fog or smoke. Further, viewing field depth may be a default value set by the System Administrator. Although the present invention preferably focuses on the depth of the content viewing field in a 2-D plane (a viewing content cone), it is understood other shapes, including three-dimensional ("3-D") shapes, are within the scope of the present invention. For example, 3-D conical or pyramid shapes are within the scope of the present invention.

The viewing content cone according to the present invention provides a quality filter for searching an image. As a quality filter, the viewing content cone will consider static objects of the image that are not included in the viewing content cone as not being part of the image and, therefore, cannot become false-positives when searching. This will be described in more detail referring to FIG. 4.

Figure 4:
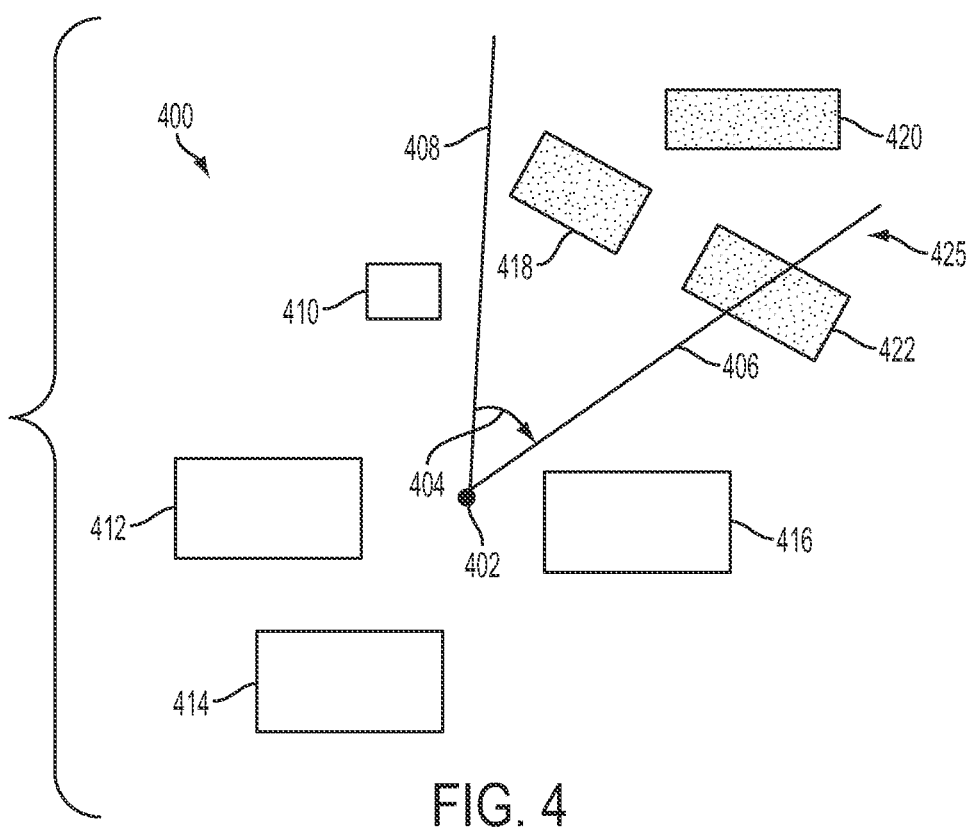
FIG. 4 shows an example of infrastructure objects that lie in whole or in part in a viewing content cone from a viewing location and infrastructure objects that lie outside of the viewing content cone.

Referring to FIG. 4, generally at 400, an image is shown that includes objects 410, 412, 414, 416, 418, 420, and 422. According to the present invention, a camera at location 402 has viewing angle 404. Given viewing angle 404, rays 406 and 408 formed by the focal length of the lens of the camera 402 will define viewing content cone 425. Therefore, according to the present invention, viewing content cone 425 acts as a quality filter. As such, objects 418, 420, and 422 would lie within the cone and be considered part of the image. It is noted that although object 422 is partially in the cone, it still would be consider within the cone. Objects 410, 412, 414, and 416 lie outside viewing content cone 425 and, therefore, are not considered part of the image. As such, using the method of the present invention, false-positive hits are reduced in carrying out the search aspects of the present invention.

MISIS indexing according to the present invention is based on the content of the object-based GIS datasets stored in storage 115 at 118. These datasets contain the footprints of individual geospatial instances or landmarks as they are used in spatial cognition and communication. These datasets may also contain 3-D representations of the objects in the viewing content cone.

The present invention links a viewing content cone with the GIS datasets for the purpose of MISIS spatial content-based indexing and searching. Further, the use of a spatial index according to the present invention will allow for fast identification and recognition of objects that are visible from the system user's specific point of view. This point of view is a major consideration because it is the point from which indexing takes place. It is understood that the system user's point of view would mean at least the location of the system user's camera that is part of the MISIS client.

Preferably, the linking process according to the present invention will be based on predetermined indexing trees. These indexing trees may be used for indexing objects contained in images of the environment. For purposes of the present invention, reference to "indexing objects" means identifying objects contained in an image, annotating the image accordingly, and linking the image to the indexing tree in a database. Although the following four indexing trees will be described, it is understood that more or less than these four indexing trees may be used and still be within the scope of the present invention.

BSP: A Binary Space Partitioning ("BSP") Tree organizes objects within a space according to a cutting plane. The cutting plane is used to categorize objects in the space as either being in "front" or in "back" of the plane. For example, consider a cube and a cutting plane that divides the cube into equally sized partitions. If the view direction is based on the cutting plane, objects encompassed by the partitions can now be described as being in front of the cutting plane or in back of the cutting plane. This process is iteratively applied to each partition, until the partitions conform to some criteria, such as containing only a single object.

Octree: The space around the origin point is divided up into eight octants. Each octant is marked occupied or free according to whether there is any object occupying that location in the environment to be represented. Each occupied octant is then divided again into eight subspaces and the process continues recursively until sufficient resolution has been achieved. More particularly, the Octree method iteratively partitions space in regular cubes until the spatial units are fully contained in the leaves of the tree. Again consider the cube containing a set of objects as a starting point, the cube will be subdivided into eight uniform cubes. This process is iteratively applied until each object is mapped into the tree.

R-Tree: The space is split into hierarchically nested, and possibly overlapping, minimum bounding rectangles. Each node of an R-tree has a variable number of entries (up to some pre-defined maximum). Each entry within a non-leaf node stores two pieces of data: a way of identifying a child node, and the bounding box of all entries within this child node. For example, consider a 2-D plane that contains a set of objects. This plane is subdivided into minimal bounding rectangles with each containing a set of minimum bounding rectangles. This process is iteratively applied on each minimum bounding rectangle until each minimum bounding rectangle contains a set of individual objects that is less than a predetermined maximum number.

KD-Tree: The KD-tree is a binary tree in which every node is a k-dimensional point. Every non-leaf node generates a splitting hyperplane that divides the space into two subspaces. Points left to the hyperplane represent the left sub-tree of that node and the points right to the hyperplane represent the right sub-tree. The hyperplane direction is chosen in the following way: every node split to sub-trees is associated with one of the k-dimensions, such that the hyperplane is perpendicular to that dimension vector. So, for example, if for a particular split, the "x" axis is chosen, all points in the sub-tree with a smaller "x" value than the node will appear in the left sub-tree and all points with larger "x" value will be in the right sub-tree. As an example, consider a 2-D plane containing a set of objects, this plane is split into two partitions, with each partition containing the same number of objects. The resulting partitions are further partitioned according to the same method until each partition contains less than a predetermined number of objects.

These indexing trees are used in combination with thematic data from External Data Sources/Content Providers/Search Engine block 120 and multimedia content section 116 linked to spatial objects to identify contents in an image and annotate the image accordingly. Therefore, according to the present invention, this combination supports efficient and fast retrieval of subsets of objects for query processing. Further, as the indexing trees provide information about the topological setup of the image, reliable indexing of the image takes place within the viewing content cone.

According to the present invention, the MISIS index is generated by intersecting the viewing content cone with a spatial data set that includes the area in which the image is taken. The data set can be either 2-D or 3-D. The intersection that is based on a spatial indexing tree mechanism identifies the objects that are candidates for indexing. Following this, the image is updated with information about image content, i.e., thematic data about spatial objects in the image, and spatial content, i.e., position and orientation, and the spatial indexing tree is updated with information about available images.

Preferably, the indexing and updating workflow according to the present invention includes four process steps. First, the system user captures some multimedia, such as a picture, with their mobile pointing device that includes a MISTS client. Second, the media (the picture) is sent to the MISIS server where it is tagged, annotated, an indexed based on the spatial context from location and orientation information captured by the MISIS client at the time of picture creation. Third, the annotated and indexed media is stored in a multimedia database. Fourth, a second system user uses a MISIS client to query, find, and retrieve media based on the stored context information that tagged and annotated the media.

As new media is submitted to the MISIS server, the MISIS indexing system is updated to include all additions and changes. Spatial context, such as location and orientation, are used to index the media, which will mean that when a system user is taking a picture on their vacation with their cell phone, these pictures will be tagged automatically. The tags will describe, for example, what the picture is of, such as the "Parthenon, Athens, Greece" or "8 Elm Street, Orono, Me. 04473."

Figure 5A:
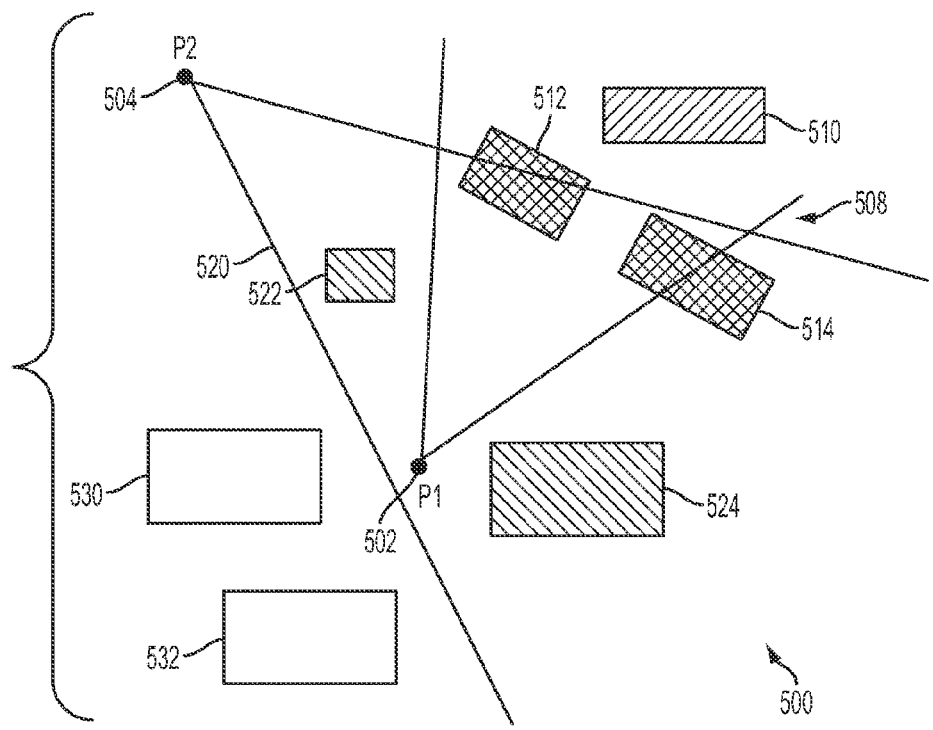
FIGS. 5A, 5B, 5C, and 5D show a progression of image searching and Boolean indexing according to the present invention.

According to the present invention, two incremental settings of the MISIS index are distinguished according to Boolean process that will be described referring to FIGS. 5A, 5B, 5C, and 5D. Referring to FIG. 5A, shown generally at 500, a scene is shown having two images taken from two index points, point P1 at 502 and point P2 at 504. According to the pointing direction, viewing angle, and focal length of the lens of the camera at point P1, viewing content cone 506 is generated. As shown, viewing content cone 506 captures objects 510, 512, and 514.

Again referring to FIG. 5A, according to the pointing direction, viewing angle, and focal length of the lens of the camera at point P2, viewing content cone 520 is generated. Viewing content cone 520 captures objects 512, 514, 522, and 524. As is also shown in FIG. 5A, objects 530 and 532 are not captured by viewing content cone 506 or 520, and, therefore, are not considered part of the image.

Figure 5B:
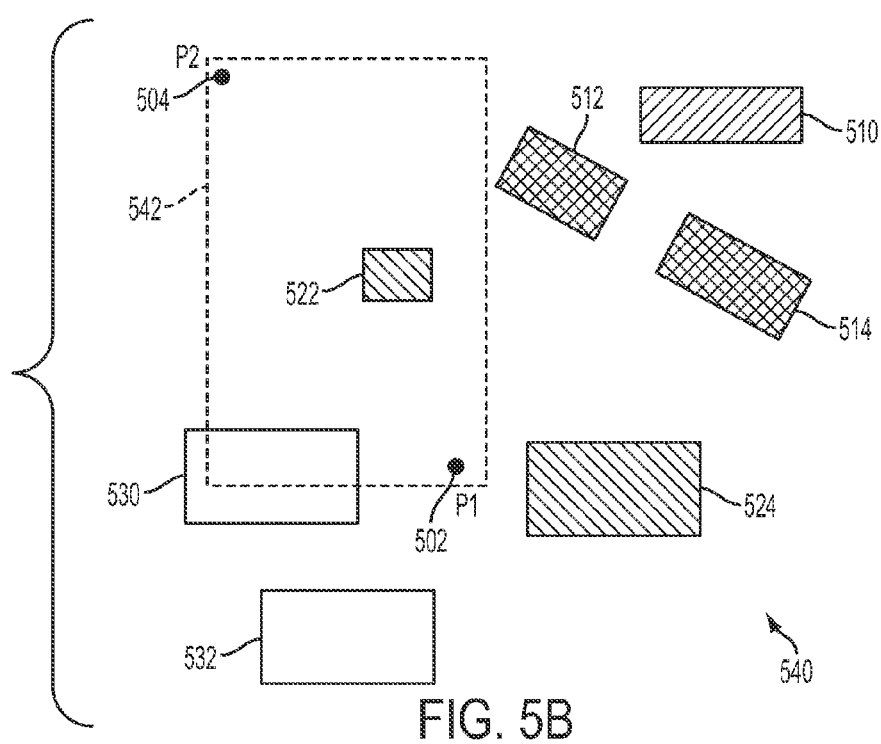

Referring to FIG. 5B, generally at 540, searching window 542 is shown with respect to the scene that includes objects 510, 512, 514, 522, 524, 530, and 532. In FIG. 5B, in a search for images, it is seen that search window 542 includes no objects found in viewing content cone 506 that relates to point P1 at 502. However, it is seen that object 522 is found in viewing content cone 520 that relates to point P2 at 504.

Figure 5C:
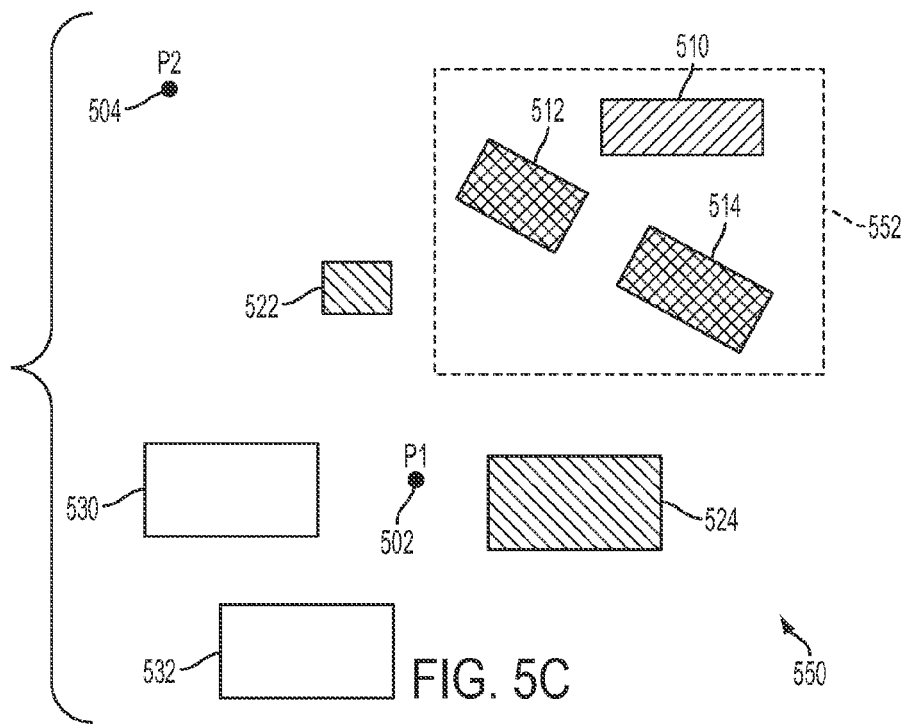

Referring to FIG. 5C, generally at 550, searching window 552 is shown with respect to the scene that includes objects 510, 512, 514, 522, 524, 530, and 532. In FIG. 5C, in a search for images, it is seen that search window 552 includes objects 510, 512, and 514 found in viewing content cone 506 that relates to point P1 at 502. It is also seen that search window 552 includes objects 512 and 514 found in viewing content cone 520 that relates to point P2 at 504. Accordingly, objects 512 and 514 are found in both viewing content cones while only object 510 is found in viewing content cone 506.

Figure 5D:
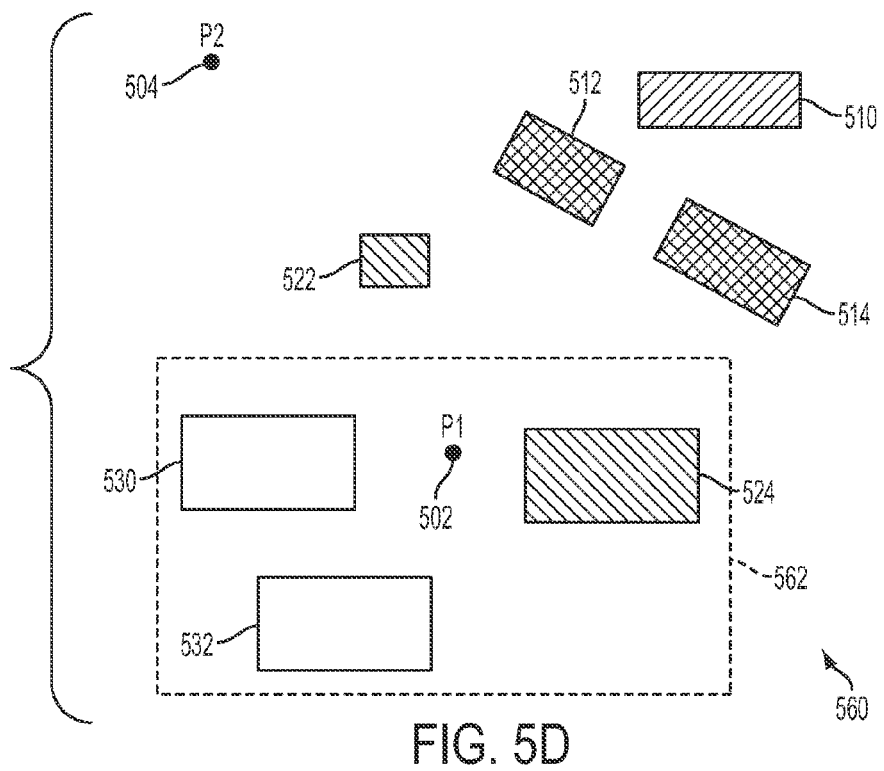

Referring to FIG. 5D, generally at 560, searching window 562 is shown with respect to the scene that includes objects 510, 512, 514, 522, 524, 530, and 532. In FIG. 5D, in a search for images, it is seen that search window 562 includes no objects found in viewing content cone 506 that relates to point P1 at 502. It is also seen that search window 562 includes object 524 found in viewing content cone 520 that relates to point P2 at 504.

The results of the processing according to FIGS. 5A, 5B, 5C, and 5D are a list of objects that will be used to tag and annotate the image.

The MISIS Boolean process described with respect to FIGS. 5A, 5B, 5C, and 5D determine whether or not an image contains a particular infrastructure object or conversely whether an infrastructure object is shown only within a particular image. This process may be carried out using an index over 2-tuples, which can be stored in and retrieved from a relational database that is part of MISIS server 108 or other storage location including on the MISIS client. The information that is retrieved may be, for example, the image that shows the South side of 11 Oak Street and the north side of 8 Elm Street. The retrieval of information using an index over 2-tuples can be very rapid with retrieval times preferably within seconds. An example of an index over 2-tuples includes, but is not limited to, the following: <object ID, image ID> <image ID, object ID>.

The MISIS Boolean process enables at least three types of queries:

(1) What images are available for object X?
(2) What objects are shown in image A?
(3) Is object X shown on image A?

The results of the first two queries include sets of identifiers that can be logically combined with results of a number of these types of queries through, preferably, SQL query statements. The two sets of identifiers preferably are a set of image identifiers and a set of object identifiers. These results can serve as input for visual browsing or for more time-consuming image processing analysis.

According to present invention, MISIS relevance is attached to each object to indicate how well each image represents that object. Preferably, relevance value ranges between "0" (not represented) and "1" (completely represented). For example, a MISIS relevance value could be "0.5." This would mean that the image represents the object in a manner that is 50% of what could be a complete representation of the object. Also, preferably, the relevance value is generated based on the criteria that includes, but is not limited to, nearness, centrality, and overlap. These three criteria will now be described; however it is understood that more or less than these criteria may be used and still be within the scope of the present invention.

Nearness: Nearness refers to the position of the object to the camera location within the viewing content cone. Preferably, this relevance measure is a higher value the closer the object is located to the camera. However, if an object is too close to the camera lens, it will be blurred and the relevance measure for very close objects will be lower.

Centrality: Centrality refers to the object's location with respect to the camera's viewing angle. Preferably, this second relevance measure is higher for objects that are just closer to the centerline of the viewing content cone and lower the closer to the rays that define the limits of the viewing content cone. The centrality measure is based on the assumption that objects of major interest tend to be located at the center of the picture, while objects that are of lesser interest are typically located near the periphery.

Overlap: Overlap refers to the capture of the object within a viewing content cone. Preferably, this third relevance measure is higher for objects captured completely and lower for partial pictures of objects. The overlap or obstruction of objects in an image will be correlated with information from the spatial indexing information from GIS data section 118 to provide metric details for the measurement of the overlap criteria.

The MISIS relevance index is associated with each spatial object in a viewing content cone. The image index is stored for each object in GIS data section 118 or in MISIS server 108 at 114, but may also be stored on mobile device 102. The MISIS image index that is stored preferably includes 6-tuples. An example of a 6-tuple image index that is stored in MISIS server 108 at 114 and 118, includes, but is not limited to, the following: <object ID, image ID, relevance measure, camera location, camera angle, date/time>. MISIS relevance index enables a system user to input the following types of queries:

(1) What are the n most representative images available for object A?

(2) What are the n most representative images available for object A showing the object from approximately the same direction?

(3) From what perspectives are no images available for object A?

(4) What images show object A from (approximately) opposite (orthogonal) directions?

Further, the MISIS relevance index will permit more advanced visual analyses of images. For example, using MISIS relevance index a system user could create a visual walk around an object by sorting the images in a clockwise or counterclockwise sequence. The system user could also create a visual walk towards an object starting from a specific location. The system user could also geolocate and track moving objects with respect to infrastructure objects.

It is understood that the elements of the systems of the present invention may be connected electronically by wired or wireless connections and still be within the scope of the present invention.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more programmable logic (e.g., an ASIC), logic gates, a processor, and a memory.

Various modifications to the disclosed embodiments will be apparent to those skilled in the art, and the general principals set forth below may be applied to other embodiments and applications. Thus, the present invention is not intended to be limited to the embodiments shown or described herein.

The invention claimed is:

1. A computer-implemented method for image searching and image indexing for identifying image content in at least one digital image representation of a real world visual scene, comprising the steps of (A) determining for a mobile pointing device a mobile device geographic location, pointing direction, and a viewing angle;

(B) retrieving from a first storage location the digital image that relates to the real world visual scene that is associated with the mobile pointing device geographic location;

(C) generating at least a first viewing content cone that includes the mobile pointing device pointing direction, with the mobile pointing device geographic location being the index of the first viewing content cone, and overlaying the digital image with the first viewing content cone;

(D) determining potential objects of the digital image that are within limits of the viewing content cone;

(E) retrieving object-based datasets from a second storage location, with the object-based datasets including at least information relating to potential objects within the viewing content cone determined at Step (D);

(F) determining each object within the limits of the viewing content cone at Step (D) by linking object-based dataset information retrieved at Step (E) with each such object by indexing with an indexing mechanism each object potentially contained within the viewing content cone and assessing at least thematic information associated with each such object; and (G) electronically annotating the digital image with an image position and directional orientation, and with respect to at least each object determined to be within the viewing content cone annotating thematic information.

2. The method as recited in claim 1, wherein the method further includes the step of:

(H) updating the indexing mechanism at Step (F) with information about available images for objects determined to be within the viewing content cone.

3. The method as recited in claim 1, wherein the mobile pointing device geographic location includes being determined by a global positioning system (GPS).

4. The method as recited in claim 1, wherein the mobile pointing device pointing direction includes being determined by a digital compass.

5. The method as recited in claim 1, wherein the mobile pointing device viewing angle includes being determined by an optical system associated with the mobile pointing device.

6. The method as recited in claim 1, wherein the mobile pointing device viewing angle includes being determined as a system default setting.

7. The method as recited in claim 1, wherein indexing with an indexing mechanism includes indexing using a Binary Space Partitioning (BSP) Tree, Octree, R-Tree, or KD-Tree (k-dimensional).

8. The method as recited in claim 1, wherein the first and second storage locations include being a single storage location.

9. The method as recited in claim 1, wherein the method further includes determining for each object within the limits of the viewing content cone a numeric value determination for the completeness of the object's representation within the digital image.

10. The method as recited in claim 9, wherein the numeric value determination includes being determined based on nearness of the object to the index of the viewing content cone, a location of the object with respect to the pointing direction determined at Step (A), or a percentage of the object that is within the limits of the viewing content cone.

11. A computer implemented system for image searching and image indexing for identifying image content in at least one digital image representation of a real world visual scene, comprising:

a mobile pointing device having at least sensors for determining a mobile device geographic location, pointing direction, and a viewing angle, and with the mobile pointing device having a capability to generate a picture of at least a portion of the visual scene that can be processed into a digital image of at least that portion of the visual scene;

a system server that is connected to the mobile pointing device that is capable of receiving the digital image generated by the mobile pointing device, with the system server for generating at least a first viewing content cone that includes the mobile pointing device pointing direction, with the mobile pointing device geographic location being the index of the first viewing content cone, and overlaying the digital image with the first viewing content cone, determining potential objects of the digital image that are within limits of the viewing content cone, retrieving object-based datasets from a second storage location, with the object-based datasets including at least information relating to potential objects within the viewing content cone, determining each object within the limits of the viewing content cone by linking retrieved object-based dataset information with each such object by indexing with an indexing mechanism each object potentially contained within the viewing content cone and assessing at least thematic information associated with each such object, and electronically annotating the digital image with an image position and directional orientation, and with respect to at least each object determined to be within the viewing content cone annotating thematic information; and system storage that connects to the system server that includes at least the first and second storage locations.

12. The system as recited in claim 11, wherein a first mobile pointing device sensor includes a global positioning system (GPS) sensor for determining the mobile pointing device geographic location.

13. The system as recited in claim 11, wherein a second mobile pointing device sensor includes a digital compass for determining the mobile pointing device pointing direction.

14. The system as recited in claim 11, wherein a third mobile pointing device sensor includes an optical system for determining a mobile pointing viewing angle.

15. The system as recited in claim 14, wherein the optical system includes a camera lens system.

16. The system as recited in claim 11, wherein the mobile pointing device includes a camera for generating the picture of at least a portion of the visual scene.

* * * * *